United States Patent [19]
Murphy

[11] Patent Number: 5,892,756
[45] Date of Patent: Apr. 6, 1999

[54] PORTABLE TELECOMMUNICATION NETWORK TESTING DEVICE

[75] Inventor: Patrick Murphy, Columbiana, Ohio

[73] Assignee: MTB Insights, Incorporated, Columbiana, Ohio

[21] Appl. No.: 790,065

[22] Filed: Jan. 28, 1997

[51] Int. Cl.⁶ .................................. H04J 3/14; H04B 3/48
[52] U.S. Cl. ................................ 370/241; 379/21
[58] Field of Search .................... 370/241, 252, 370/465, 466, 467, 242, 248, 249; 340/825.06, 825.16; 379/21, 23, 24, 25, 26, 27, 22, 93.15

[56] References Cited

U.S. PATENT DOCUMENTS

| | | |
|---|---|---|
| 3,965,309 | 6/1976 | Dotter, Jr. ............................... 375/211 |
| 5,060,226 | 10/1991 | Gewin et al. ............................ 370/244 |
| 5,224,149 | 6/1993 | Garcia ...................................... 379/22 |
| 5,317,278 | 5/1994 | Miller et al. ............................. 370/243 |
| 5,422,929 | 6/1995 | Hurst et al. ................................ 379/4 |
| 5,583,874 | 12/1996 | Smith et al. ............................. 370/245 |
| 5,619,489 | 4/1997 | Chang et al. .............................. 379/21 |
| 5,774,456 | 9/1996 | Ellebracht et al. ...................... 370/242 |

*Primary Examiner*—Chi H. Pham
*Assistant Examiner*—Afsar Qureshi
*Attorney, Agent, or Firm*—Leis Intellectual Property Consulting

[57] ABSTRACT

A testing device for testing telecommunication digital lines referred to as high-cap or T-1 lines by introducing a go/no-go loop back signal to both line sides. The testing device uses a test loop generating controller interface that can be used with any high-cap copper installation with or without line repeaters in place.

11 Claims, 2 Drawing Sheets

PORTABLE TELECOMMUNICATION NETWORK TESTING DEVICE

BACKGROUND OF THE INVENTION

1. Technical Field

This device relates to the testing of telephone lines and line repeaters used in the telecommunication industry which employ the generation of a test signal loop.

In the telecommunication industry telephone central offices (C.O) are connected by cables forming networks of "twisted wire pairs". The local telephone service provider is usually a local exchange carrier (LECS). There are also inter-exchange carriers (IXCS) that connect to the (LEC'S) to form the national network.

There are a number of different "access transport technologies" that are used to connect to a network such as ISDN, T-1, T-3, ATM, and SONET.

To access a network you need an access point and a transport facility or physical connection referred to generally as pipes. The simplest access pipe is an analog phone line that is then converted to digital by pulse code modulation and transported over the network at 64,000 BPS (Bits Per Second) defining one channel. A high-cap or T-1 line combines 24 digitized voice channels into one pipe using only two twisted wire pairs. The twisted wire pairs carry parallel transmissions. In the T-1 transmission format, the 24 channels each add 64,000 BPS combined to define the T-1 rate of 1.544 MBPS (million bits per second). Typically, signal repeaters are installed on the twisted wire pair between the central offices to regenerate the signals transmitted due to signal transmission distance limitation which inherently limits the overall distance that an effective signal can be sent without substantial degradation. Equipment faults or other line problems can occur in the transmission between the central offices and the end user. To pinpoint the faults along a T-1 line can be a difficult and time consuming task which requires line inspection and electronic testing of the line segments to isolate the problem.

To test a T-1 transmission span, it normally must be powered and accordingly requires "test equipment" that enables the line typically referred to as a "power lid" which works only on standard repeater spans.

The problem of testing is compounded in new insulations where the testing technician needs to wait for the central office (CO) to be wired before testing the line to the customer.

It is accordingly an object of this invention to overcome such problems by replacing the required "power lid" with a portable testing device capable of generating a simple go/no-go test signal loop at any location along the T-1 line without requiring central office to be wired, as noted above.

2. Description of Prior Art

Prior art devices of this type have relied on a variety of different configurations to test and configure T-1 telecommunication lines, see for example U.S. Pat. Nos. 3,965,309, 5,224,149, 5,060,226, 5,317,278, and 5,422,929.

U.S. Pat. No. 3,965,309 is directed to a test system that converts typical trio type pulse sets to quadruple sets.

U.S. Pat. No. 5,060,226 is a test system for digital telecommunication networks by a master test unit in combination with at least one remotely addressable field loop back unit.

U.S. Pat. No. 5,317,278 is a switched A-clip fault locator filter that combines multiple filters requires in a single unit.

U.S. Pat. No. 5,224,149 is a testing system for digital transmission lines with a metallic loop back and direct current by-pass for use with regenerative repeaters.

U.S. Pat. No. 5,422,929 is directed to a telephone line repeater and method of testing same wherein an inter-alia and input signal is transmitted on a telephone network that indicates an address field with at least one sub-field.

SUMMARY OF THE INVENTION

A portable testing device for use in testing T-1 digital transmission lines that uses line division multiplexing techniques with a band width up to 1.544 MBPS. The device of the invention can be used on any T-1 (high-cap) copper installation by combining a controller interface with a power supply source and a typical piece of test line equipment. The testing of the T-1 line (i.e. generating a test signal loop) is accessible by a pair of basic ¼ phone jacks providing side 1 of a T-1 line to side 2 of a T-1 line echo go/no-go test configuration signal that indicates the status of the line segment being tested.

DESCRIPTION OF THE PREFERRED EMBODIMENT

Figure 2:
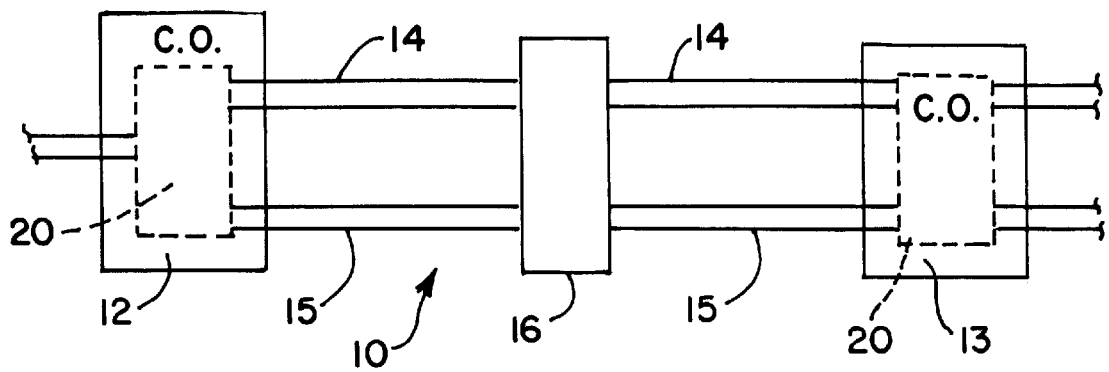
FIG. 2 is a block diagram of a typical T-1 transmission line illustrated between central offices with a repeater in place.
Figure 3:
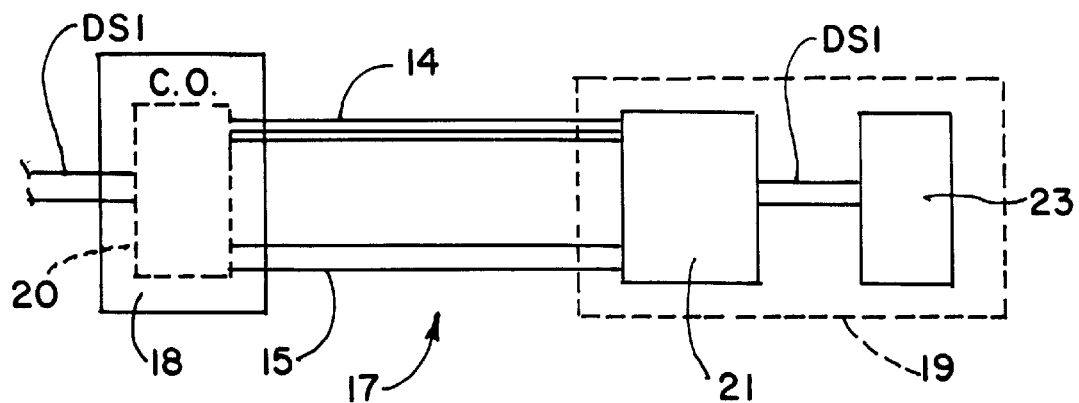
FIG. 3 is a block diagram of a T-1 transmission line from a central office to a customer.

FIGS. 2 and 3 depict the system constituting the environment in which the test device of the present invention operates. The advantage of the instant invention is that the test device can be used at any point between the central offices such as 12,13 and 18. This is in contrast to conventional arrangements in which line tests can only be carried out at company office switches where the HDSL-DS1 conversion devices are located. Referring to FIGS. 2 and 3 of the drawings, it will be seen that a typical T-1 pulse code modulator carrier system networks are illustrated. FIG. 2 of the drawings illustrate a T-1 line 10 between phone companies central offices (CO) 12 and 13. The T-1 line 10 is comprised of two full duplex high bit rate digital subscriber lines (HDSL) signals transmitted over twisted wire pairs 13 defining a side-1, 14 and side-2, 15 of a communication loop. Typically HDSL's signal repeaters 16 are used between central offices CO 12 and 13 when the transmission line distance exceeds the viable signal distance due to signal degradation beyond this point. A T-1 line 17 is illustrated between a central office (CO) 18 and a customer station 19, best seen in FIG. 3 of the drawings to illustrate this point.

In the central offices 12, 13, and 18 an interface conversion module (ICM) 20 converts an incoming digital signal (DS1) to two full duplex (HDSL) signals as hereinbefore described. The customer typically has a (HDSL) loop extender 21 (HLXR) that interfaces with the (HDSL) loops converting same back into a (DS1) type signal 22 for presentation to the customers equipment (CPE) 23 as will be well understood by those skilled in the art. In order to test the T-1 line for faults and then to pinpoint where the problem is, a test signal loop is generated onto the network spans which are determined as between the central offices 12, 13 and 18, signal repeaters 16 HDSL to DSI converter and loop extender, or customer station 19.

Figure 1:
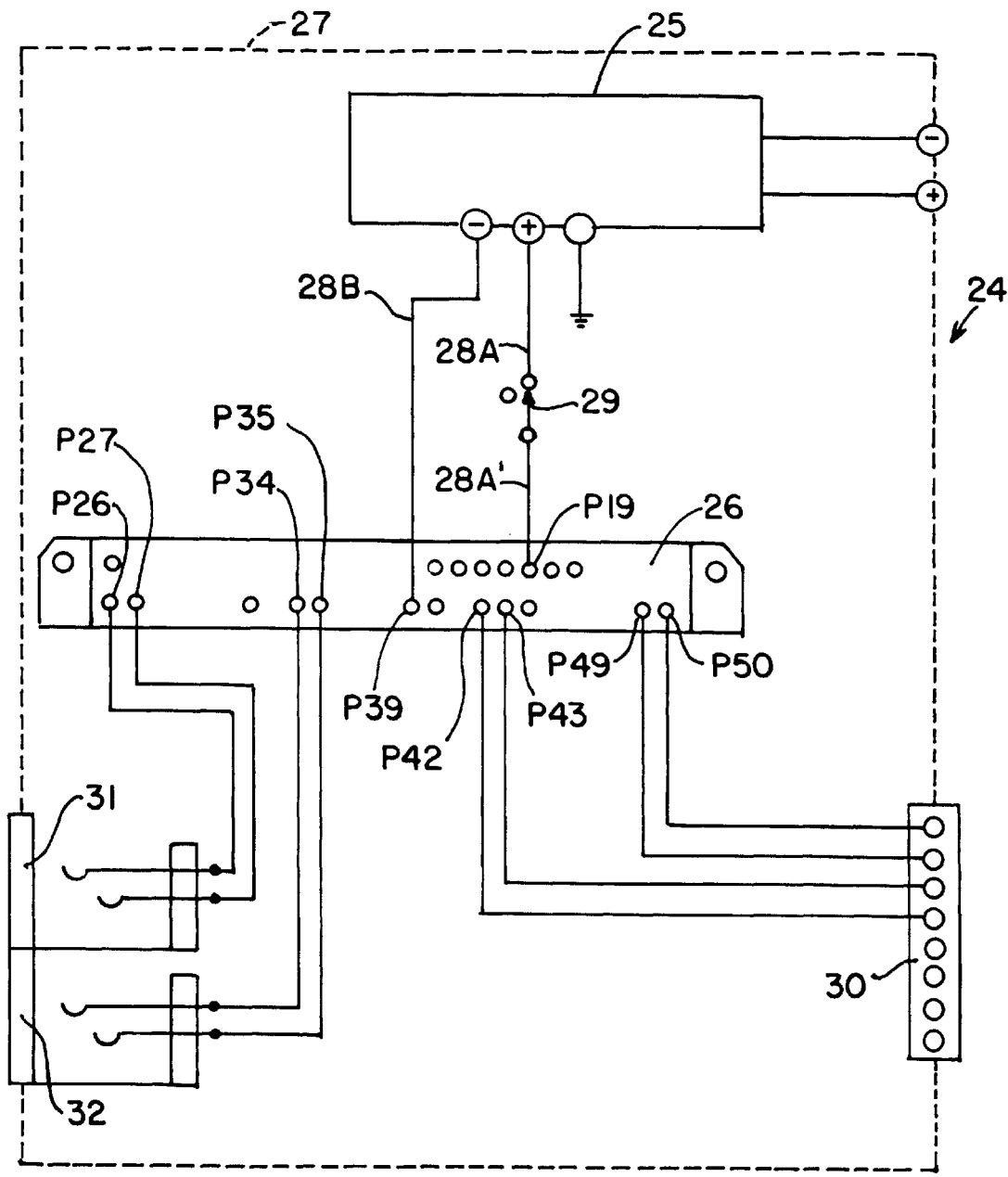
FIG. 1 is a block diagram of the components and related interconnection of the test device.

The testing device 24 of the invention (best seen in FIG. 1 of the drawings) has an 48 volt power supply 25 and a controller interface 26 for HDSL to DSL conversion as found in the central office 12, 13, and 18. All of these elements are contained in in a test box enclosure 27 illustrated by broken lines in FIG. 1 of the drawings. Power output lines 28A and 28B extend between the controller interface 26 and the power supply 25 with an on/off switch 29 on line 28A. The central interface 26 is a plug-in type module having a number of chassis card connector wire wrap pins used in fragmented numerical sequence being delineated by P(#) with the actual P(#) being used along with the pins modular delineation as set forth in the manufacturers installation manual (ADC Telecommunication, Inc.) identified as ADCD-61-062 first edition, issue no. 1.

The testing device 24 of the invention uses only ten of said P(#) pins for this application as will be hereinafter described.

A power line 28A' extends from the switch 29 to the controller interface 26 pin P19 (48Vdc return) with the power line 28B extending to controller interface 26 pin P39 (48Vdc) thus supplying power to the controller interface 26. An eight pin modular data jack 30 is interconnected to the controller interface 26 via wire wrap pins P42 [DS1 TIP (RCV) (IN)], pin P-43 [DS1 Ring (RCV) (in)], pin P-49 [DS1 TIP (XMT) (OUT)] and pin P-50 [DS1 Ring (XMT) (OUT)]. The eight pin modular data jack 30 is the interconnecting vehicle means to a standard line testing device such as T-Berd 209A "brand" T-Carrier Analyzer or the equivalent (not shown) manufactured by Telecommunication Techniques Corporation of Germantown, Md. currently used in the industry and is well known and understood by technicians skilled within the telecommunication art. A pair of standard ¼ phone jacks 31 and 32 are used as test interconnection means to the T-1 network and are interconnected to the controller interface 26 via respective pin pairs P-34 [HDSL Loop 1 TIP in/out] and pin P-35 [HDSL Loop 1 Ring in/out] for jack 32 that conforms to side-1, 14 of the T-1 line tested. Pin pairs P-26 [HDSL Loop 2 TIP in/out] and pin P-27 [HDSL Loop 2 Ring in/out] for jack 31 conform to the side-2, 15 of the T-1 line to be tested.

It will be evident that by utilizing the electronic loop generating pins of the powered controller interface 26, a simple side by side line test can be made anywhere along the T-1 network to pinpoint the line or equipment problem and/or to verify the integrity of a newly installed line or new line access by the customer 19's equipment 23.

The actual test procedures need not be described in this disclosure since they have been well developed within the industry over time in accordance with testing equipment and thus are well understood by those skilled in the art.

With the testing device 24 of the invention, a number of line continuity tests can be performed verifying correct operation at all 24 sub-channels of the T-1 line.

The testing device 24 of the invention, in some respects, operates as a portable central office having the ability to generate test signal loops when used in connection with the T-Berd "brand" test equipment (not shown) to monitor both the DS1 digital signal level 1 and HDSL signal for line path performance and determines abnormalities therein.

The testing device 24 of the invention utilizes in this example the T-Berd testing equipment to establish a link from the controller interface 26 to the T-1 line 10. The standard ¼ phone jacks 31 and 32 provide discreet side-1, line 14, and side-2, line 15 test point connections. Accordingly, a simple echo test (loop) is conducted between side-1 and side-2 of the T-1 line.

It will thus be seen that a new and novel T-1 line testing device has been illustrated and described that overcomes the problems associated with current testing equipment and provides a portable self-contained testing device when used in combination with a standard equipment tester that can readily pinpoint problems associated with telecommunication T-1 digital lines and that various changes and modifications may be made thereto without departing from the spirit of the invention.

Therefore I claim:

1. A portable testing device for sending and receiving test signals over a communications line including a communication loop having first and second sides, said device comprising:
   (a) a power source independent of said communications line;
   (b) access means for connecting to said first and second sides of said communications loop;
   (c) conversion means for converting between DS1 and HDSL formats; and,
   (d) interface means for operatively connecting said conversion means and said access means to independent testing means for generating and evaluating test signals routing through said communications loop.

2. The portable testing device of claim 1, wherein said communication line is arranged for digital communication.

3. The portable testing device of claim 2, wherein said access means are adaptable to connect to any point in said communications loop.

4. The portable testing device of claim 3, wherein said access means comprise two ¼ phone line jacks.

5. The portable testing device of claim 2, wherein said power source comprises a 48 volt power supply transformer.

6. The portable testing device of claim 2, wherein said testing means accommodate both DS1 and HDSL formats.

7. The portable testing device of claim 6, wherein said testing means provide analysis of conditions on said communications loop.

8. The portable testing device of claim 2, wherein said interface means comprise multiple wire wrap communications and inner connecting pins.

9. A method of testing at any point on a communications line including a communications loop having first and second sides, said method comprising the steps of:
   (a) accessing any selected point on said communications line with an interface device;
   (b) providing power to said interface device from a source not dependent from said communications line;
   (c) generating a test signal;
   (d) converting said test signal to HDSL format; and,
   (e) applying said converted test signal to said first side of said communications loop.

10. The method of claim 9, further comprising the additional steps of:
    (f) receiving a response to said test signal on said second side of said communication loop;
    (g) converting said response to DS1 format; and,
    (h) analyzing said converted response to derive conditions on said communications loop.

11. The method of claim 10, wherein step (a) further comprises the sub-steps of moving said interface to one of a plurality of different points on said communication line.

* * * * *